(12) United States Patent
Bollenbeck

(10) Patent No.: US 12,455,333 B2
(45) Date of Patent: Oct. 28, 2025

(54) METHOD FOR TRANSFERRING AT LEAST ONE SPEECH SIGNAL OF A PATIENT DURING A MAGNETIC RESONANCE IMAGING EXAMINATION, AND MAGNETIC RESONANCE IMAGING DEVICE

(71) Applicant: Siemens Healthcare GmbH, Erlangen (DE)

(72) Inventor: Jan Bollenbeck, Bayern (DE)

(73) Assignee: Siemens Healthineers AG, Erlangen (DE)

( * ) Notice: Subject to any disclaimer, the term of this patent is extended or adjusted under 35 U.S.C. 154(b) by 491 days.

(21) Appl. No.: 17/819,972

(22) Filed: Aug. 16, 2022

(65) Prior Publication Data
US 2023/0053619 A1 Feb. 23, 2023

(30) Foreign Application Priority Data
Aug. 17, 2021 (EP) .................................... 21191668

(51) Int. Cl.
*G01R 33/48* (2006.01)
*A61B 5/055* (2006.01)
*H03L 7/08* (2006.01)

(52) U.S. Cl.
CPC .......... *G01R 33/4806* (2013.01); *A61B 5/055* (2013.01); *H03L 7/08* (2013.01)

(58) Field of Classification Search
CPC ..................... G01R 33/283; G01R 33/3621
See application file for complete search history.

(56) References Cited

U.S. PATENT DOCUMENTS

| 3,508,155 | A | 4/1970 | Voelcker, Jr. |
| 6,215,986 | B1 * | 4/2001 | Green .................... H01Q 23/00 455/116 |
| 2010/0246872 | A1 * | 9/2010 | Ochoco .............. A61N 1/36038 607/57 |
| 2015/0244515 | A1 * | 8/2015 | Bollenbeck ........... H04L 7/0331 375/376 |
| 2018/0299522 | A1 | 10/2018 | Biber et al. |
| 2019/0090957 | A1 * | 3/2019 | De Wijs ................ A61B 8/0841 |
| 2020/0103479 | A1 | 4/2020 | Bollenbeck |

FOREIGN PATENT DOCUMENTS

DE 102018216644 A1 4/2020

OTHER PUBLICATIONS

Anonymous: "Wikipedia—Amplitude modulation"; Dec. 4, 2019 (2019-12-04), XP055723381; Gefunden im Internet: URL: https://en.wikipedia.org/w/index.php?title=Amplitude_modulation&oldid=929193037.

* cited by examiner

*Primary Examiner* — Rochelle D Turchen
(74) *Attorney, Agent, or Firm* — Banner & Witcoff Ltd.

(57) ABSTRACT

Techniques are disclosed for transferring at least one speech signal of a patient during a magnetic resonance imaging examination, wherein the speech signal is recorded by a speech recording device of a wireless communication device assigned to the patient and transmitted at least as part of a communication signal to a receive device of the magnetic resonance imaging device. The communication signal is a modulated signal or is generated from a modulated signal, and to generate the modulated signal the speech signal is modulated onto a carrier signal. The modulated signal is generated by way of a modulation with reduction of the level of the carrier signal.

14 Claims, 3 Drawing Sheets

7: Communication device
9: Speech acquisition device
10: Carrier signal generator
11: Double balanced mixer
12: Offset device
13: Transmit apparatus

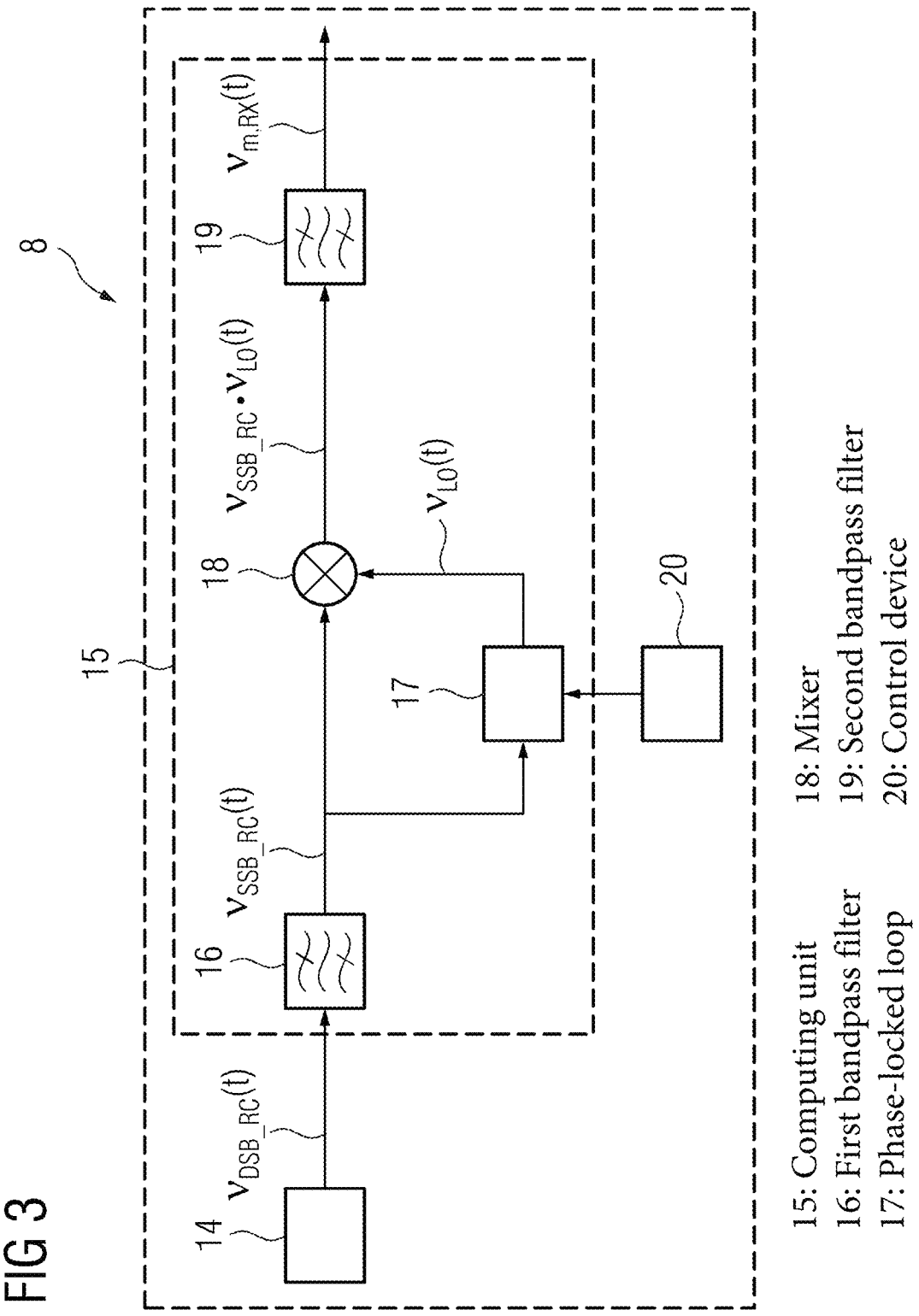

METHOD FOR TRANSFERRING AT LEAST ONE SPEECH SIGNAL OF A PATIENT DURING A MAGNETIC RESONANCE IMAGING EXAMINATION, AND MAGNETIC RESONANCE IMAGING DEVICE

CROSS-REFERENCE TO RELATED APPLICATIONS

The present application claims the benefit of the filing date of Europe patent application no. EP 21191668.9, filed on Aug. 17, 2021, the contents of which are incorporated herein by reference in their entirety.

TECHNICAL FIELD

The disclosure is directed to techniques for transferring at least one speech signal of a patient during a magnetic resonance imaging examination, wherein the speech signal is recorded by a speech recording device of a wireless communication device assigned to the patient and transmitted as part of a communication signal to a receive device of the magnetic resonance imaging device. The disclosure also relates to a magnetic resonance imaging device.

BACKGROUND

In a magnetic resonance imaging device, a patient is normally arranged for the purpose of an examination on a patient support, which is located within a through opening, also referred to as a patient aperture, of the imaging device. In order to enable the patient to communicate with an operator of the imaging device who is located for example outside of an examination room, it is known to record the patient's voice and transmit it to the operator via a communication device. In this context, a patient microphone can be arranged at end regions of a patient aperture region of the imaging device, for example. These microphones are, however, arranged at a great distance from the patient, so that a wide variety of interference noises, which are generated for example by the operation of the imaging device, are likewise recorded and transferred to the operator.

A wireless patient microphone for use in a magnetic resonance imaging device is known from DE 10 2018 216 644 A1. This can be arranged within a patient aperture in the direct vicinity of the patient's mouth to achieve better speech intelligibility. For transferring the recorded speech, the patient microphone has a modulator, which is used to modulate the recorded speech into an analog communication signal. To modulate the communication signal, an amplitude modulation and/or an angle modulation is proposed in this regard.

Magnetic resonance imaging devices comprise one or several receive systems to receive the signals necessary for imaging. These receive systems and/or the evaluation of the received signals are generally highly susceptible to electromagnetic interference. For example, on account of the use of multidimensional Fourier analysis techniques to evaluate the received signals, continuous interference signals can become particularly apparent, as a result of which artifacts can occur in the imaging. A signal transferred from a wireless patient microphone can also represent such an interference signal and, for this reason, have a negative effect on the imaging by means of the magnetic resonance imaging device.

SUMMARY

An object of the disclosure is therefore to specify an improved method for transferring at least one speech signal of a patient during a magnetic resonance imaging examination, which reduces an interference effect of the speech signal being transferred on the imaging.

To achieve this object, provision is made in a method of the kind mentioned in the introduction for the communication signal to be a modulated signal or to be generated from a modulated signal, wherein to generate the modulated signal the speech signal is modulated onto a carrier signal, and wherein the modulated signal is generated by way of a modulation with reduction of the level of the carrier signal.

A modulation with reduction of the level of the carrier signal may also be referred to as reduced carrier modulation. Here, the level of the carrier signal is reduced to a fixed level, which is greater than zero. The carrier signal may be reduced to a fixed level, which lies below the carrier level for a transmitter-side modulator. The reduced level of the carrier signal is e.g. lower than the level of a carrier signal that is modulated using classic amplitude modulation. The reduced carrier level is transferred as part of the communication signal to the receive device, and serves for example as a reference frequency. The received reduced-level carrier signal portion of the communication signal is used e.g. in the receive device for generating a reconstructed carrier signal, wherein the reconstructed carrier signal is used for the demodulation of the received and/or filtered communication signal.

To generate the communication signal, the speech signal is recorded, e.g. continuously, by a speech recording device of the communication device. The speech recording device can be a microphone, for example, which records sound from the immediate vicinity of the patient. The electrical signal generated by the speech recording device is referred to herein as a speech signal, even if speech is not recorded continuously but instead only in cases in which the patient is speaking. If the patient is not speaking, the speech signal can describe other noises such as for example ambient noises and/or breathing noises of the patient.

The speech signal is modulated onto the carrier signal as a modulation signal in the communication device, as a result of which a modulated signal is generated. During the modulation, the level of the carrier signal is reduced in comparison with a normal amplitude modulation with a full carrier level, for example by a factor between −10 dB and −40 dB, for example −30 dB. The modulated signal generated can be used directly as the communication signal. Alternatively, the communication signal can be generated from the modulated signal, for example by means of filtering or the like. In both cases, the communication signal is subsequently transmitted to the receive device. The communication signal can be demodulated in the receive device, e.g. with the aid of a reconstruction of the carrier signal, so that the reconstructed speech signal is also available in digital and/or analog form in the receive device. The communication signal can be demodulated directly in the receive device or it can undergo further processing, for example filtering. The reconstructed speech signal can then be processed further, recorded, and/or output.

The use of a modulation with reduction of the level of the carrier signal has the advantage that the coherent portion of the communication signal arising from the carrier signal can be reduced. In a conventional dual sideband amplitude modulation with full carrier (dual sideband modulation with full carrier, DSB-WC), on the other hand, the carrier signal remains independent of a level of the modulation signal in the signal spectrum, even if for example the amplitude of a modulated-on speech signal becomes small, for example when the patient is not speaking into the communication device.

Here, the portion of the carrier signal corresponds to a continuous, phase-coherent cosine signal, which as a continuous interference signal can influence the imaging in the magnetic resonance imaging device. Here, interference can arise for example as a result of harmonics of the carrier signal spectrum either falling directly into receive ranges of the imaging device or appearing as a result of intermodulation with further, at least temporarily continuous signals in a receive range, a secondary receive range, or an alias band of the analog-digital conversion. This can occur e.g. if the frequency of the carrier signal lies outside the frequency spectrum for the imaging. Furthermore, methods for generating an item of movement information, for example a pilot tone method or the like, can also be disturbed by harmonics of the carrier signal.

Such interference can also occur accordingly during a frequency modulation. During the frequency modulation, too, the carrier signal remains in the signal spectrum under certain circumstances, e.g. if no modulation takes place. Moreover, the magnitude spectrum of a narrowband frequency modulation with a decreasing modulation signal becomes increasingly similar to the magnitude spectrum of a dual sideband amplitude modulation, so that the problem outlined with regard to transmission by means of a DSB-WC signal is present in a substantially analogous manner for frequency modulation.

Generating the communication signal transmitted by the communication device by means of a modulation with reduction of the level (e.g. amplitude) of the carrier signal significantly reduces the interferences or interfering influences on the imaging that arise as a result of the transfer of the communication signal from the communication device to the receive device of the imaging device. This method is thus advantageously suitable for use in a magnetic resonance imaging device. For instance, it enables the communication device to be operated even during receive phases of the magnetic resonance imaging device without disturbing the imaging.

An additional advantage of the method according to the disclosure is a reduction in the transmit power required, as compared with a conventional amplitude modulation with full carrier a higher proportion of the power lies in the sidebands of the modulated signal or of the communication signal, which sidebands comprise the information, in other words the speech signal. In a conventional dual sideband amplitude modulation with carrier, in the best case with a modulation index m=1, two thirds of the power is located in the unmodulated carrier, and only one third of the power in the sidebands. As the modulation index decreases, the carrier power remains unchanged while the power on the sidebands continues to decrease steadily. During a frequency modulation, too, the amplitude of the carrier is unchanged and the total power therefore always corresponds to the power of the unmodulated carrier, independently of the modulation.

Because the patient does not usually speak continuously during an imaging examination, e.g. to avoid movements of the patient and thus further interfering influences on the imaging, the communication device usually records no speech of the patient for most of the time. In such a case, only faint interference noises are usually received as the speech signal. Although the transferred communication signal in this case comprises only a speech signal or a modulation signal with a very low amplitude, in the case of frequency modulation the same power, or in the case of a conventional amplitude modulation approximately the same power, is converted in the communication device as for a maximum level of the speech signal which occurs for example when the patient speaks loudly into the communication device or its speech recording device.

Through the use of a modulation with reduction of the level of the carrier signal for generating the modulated signal, it is therefore also possible to reduce the proportion of power of the carrier signal, as a result of which the maximum peak power consumption during generation of the communication signal is advantageously reduced. This also correspondingly reduces the energy consumption in the communication device and therefore enables the use of a smaller energy storage unit, for example a smaller accumulator, in the communication device, and thus a smaller size of the communication device. Alternatively, a longer runtime of the communication device with the same size of energy storage unit can also be achieved.

It would in principle also be conceivable to use a modulation with full suppression of the level of the carrier signal. This is however disadvantageous in that, without a carrier signal portion in the communication signal, no synchronization with the carrier signal in the receive device is possible, such as can advantageously take place with the use of a carrier signal with reduced level.

In a dual sideband modulation with suppressed carrier (SSB-SC), although the transmit-side switching complexity is lower, this can however result in problems in receiving the speech signal on the receiver side if the phase angle of a frequency of a local oscillator deviates from the phase angle of the carrier signal, and therefore no coherent demodulation is possible, as can be identified easily from the following consideration.

A DSB-SC signal can be described in accordance with Equation 1 below as follows:

$$v_{DSB-SC}(t) = K_{AM_{Mod}} * \hat{V}_m * \cos(\omega_m t) * \hat{V}_c * \cos(\omega_c t) = \\ K_{AM_{Mod}} * \frac{\hat{V}_m * \hat{V}_c}{2} * [\cos((\omega_c - \omega_m)t) + \cos((\omega_c + \omega_m)t)].$$

Eqn. 1

Here, $\hat{V}_m$ represents the amplitude or the level of the modulation signal, in this case the speech signal, $\omega_m$ represents the circuit frequency of the modulation signal or the speech signal, $\hat{V}_c$ represents the amplitude or the level of the carrier signal, and $\omega_c$ represents the frequency of the carrier signal. The constant $K_{AM\_Mod}$ represents a measure for the modulator sensitivity and has the unit 1/V. In the following, to simplify the representation, the constant $K_{AM\_Mod}$ is set to $1/\hat{V}_c$.

Multiplying the received communication signal $v_{DSB-SC}(t)$ by the signal of a local oscillator $v_{LO}(t)$, which can be described in accordance with Equation 2 below as follows:

$$v_{LO}(t) = \hat{V}_{LO} * \cos(\omega_c t + \varphi),$$

Eqn. 2 where $\hat{V}_{LO}$ represents the amplitude of the local oscillator and $\varphi$ represents the phase shift between the signals $v_{LO}(t)$ and the carrier signal of $v_{DSB-SC}(t)$, which results in the expression as shown in Equation 3 below as follows:

$$K_{AM_{Demod}} * v_{DSB-SC}(t) * v_{LO}(t) = \qquad \text{Eqn. 3}$$

$$K_{AM\_Demod} * \frac{\hat{V}_m * \hat{V}_{LO}}{4} * (\cos(\omega_m t + \varphi) + \cos((2\omega_c - \omega_m)t + \varphi)) +$$

$$K_{AM_{Demod}} * \frac{\hat{V}_m * \hat{V}_{LO}}{4} * (\cos(\omega_m t - \varphi) + \cos((2\omega_c + \omega_m)t + \varphi)),$$

where after a bandpass filtering or a low-pass filtering on the frequency or the frequency band of the modulation signal for the received modulation signal $v_{m,RX}$ (t) is expressed in accordance with Equation 4 as follows results:

$$v_{m,Rx}(t) = \hat{V}_m/2 * \cos(\omega_m t) * \cos(\varphi) \qquad (4)$$

The constant KAM Demod represents a measure for the demodulator sensitivity and has units 1/V. To simplify the representation, the constant KAM Demod has been set to $1/\hat{V}_{LO}$.

As can be identified in Eqn. 4, the amplitude of the resulting modulation signal $v_{m,Rx}(t)$ is dependent on the phase relationship φ between the original carrier signal and the local oscillator signal $v_{LO}(t)$. This dependency arises because the phase of the carrier signal influences the phases of the amounts from the two sidebands in the opposite direction, as can be seen in Eqn. 3. A phase shift of φ=±π/2 can result in a complete extinguishing of the amplitude of $v_{m,Rx}$ (t).

It is advantageously possible to dispense with a cumbersome reconstruction of the carrier signal with regard to frequency and phase in the receiver in that the modulation takes place with a reduction of the level of the carrier signal. In this case, a carrier with a reduced level is transferred, which enables a reconstruction of the carrier signal for the demodulation of the communication signal in the receiver.

What is known as a dual sideband modulation with reduced carrier (DSB-RC) can be carried out, for example. Here, the communication signal $v_{DSB-RC}(t)$ received in this case results as follows in accordance with Equation 5 below:

$$v_{DSB-RC}(t) = \left(k + \hat{V}_m * K_{AM_{Mod}} * \cos(\omega_m t)\right) * \hat{V}_c * \cos(\omega_c t) = \qquad \text{Eqn. 5}$$

$$\frac{\hat{V}_m}{2} * \cos((\omega_c - \omega_m)t) + k * \hat{V}_c * \cos(\omega_c t) + \frac{\hat{V}_m}{2} * \cos((\omega_c + \omega_m)t),$$

where k represents a relative measure for the carrier amplitude. Here, the parameter k is greater than 0 and less than 1.

Using a local oscillator signal $\hat{V}_{LO}(t)$, which can be obtained from the transferred carrier signal with the reduced level, the demodulated signal results as follows in accordance with Equation 6 below:

$$K_{AM_{Demod}} * v_{DSB-RC}(t) * v_{LO}(t) = \qquad \text{Eqn. 6}$$

$$K_{AM_{Demod}} * \frac{\hat{V}_m * \hat{V}_{LO}}{4} * (\cos(\omega_m t + \varphi) + \cos((2\omega_c - \omega_m)t + \varphi)) +$$

$$\frac{k * K_{AM_{Demod}} * \hat{V}_c * \hat{V}_{LO}}{2} * (\cos(\varphi) + \cos(2\omega_c t + \varphi)) +$$

$$K_{AM_{Demod}} * \frac{\hat{V}_m * \hat{V}_{LO}}{4} * (\cos(\omega_m t - \varphi) + \cos((2\omega_c + \omega_m)t + \varphi)),$$

which is filtered accordingly in a bandpass filtering operation on the frequency or the frequency range of the speech signal $\omega_m$ with the simplification $K_{AM\_Demod} = 1/\hat{V}_{LO}$ to result in a signal in accordance with Equation 7 below as follows:

$$v_{m,Rx}(t) = \hat{V}_m/2 * \cos(\omega_m t) * \cos(\varphi) \qquad \text{Eqn. 7}$$

Because the transmitted reduced-level residual carrier can be reconstructed in the receive device, the local oscillator signal can advantageously be reconstructed without a phase shift, in other words with φ=0. The speech signal $v_{m,Rx}(t)$ can thus advantageously also be reconstructed in the receive device without amplitude fluctuations.

In a magnetic resonance imaging device, it can happen that the communication signal cannot be received continuously, e.g. if the magnetic resonance imaging examination is in the excitation phase of an image acquisition sequence. In such an excitation phase, strong radio frequency (RF) and gradient magnetic fields are generated, which can interfere with the transmission of the communication signal on account of their high amplitudes or field strengths. The use of a modulation with reduction of the level of the carrier signal for generating the communication signal enables a continuous transfer of the communication signal, as no or substantially no interferences are generated in the receive phases, so that advantageously there is no need for the communication device or a transmission device of the communication device to be switched off and on. As a result, the switching complexity in the communication device and the magnetic resonance imaging device can advantageously be reduced.

The use of a modulation with reduction of the level of the carrier signal for generating the communication signal advantageously enables a fast and simple synchronization with the carrier on the receiver side, so as to re-enable speech reception after switching off the gradient fields. Until the reconstructed carrier has been generated, the speech quality can however be insufficient on account of the amplitude of the demodulated speech signal being dependent on the phase relationship.

In clinical applications, MR sequences can typically extend over several minutes, for example over 5 minutes. At least during the transmit phases or the excitation phases of the magnetic resonance imaging device, the communication signal, thus also the reduced carrier signal, cannot be received on the receiver side because the amplitudes or the signal levels of the transmit positions transmitted by the magnetic resonance imaging device are too great. In such a case, the synchronization is lost in the receiver even if a reduced carrier is used. During an individual transmit phase, or during an MR sequence comprising several transmit phases, the reception of the communication signal in the receiver can thus be interrupted and/or deactivated.

In an embodiment of the disclosure, it can be provided that the reduced carrier signal and a sideband of the modulated signal are transferred as the communication signal. The modulation content is in each case contained fully in each of the two sidebands, so that it is generally sufficient to transfer only one of the two sidebands.

The generation of the modulated signal can take place as a single sideband modulation with reduced carrier (SSB-RC). This has the advantage of further reducing the required transmit power. A disadvantage of using a single sideband modulation is that a more complex transmitter-side circuit is produced. For instance, the transmitter-side signal processing is highly complex, so that complex analog circuits requiring a comparatively large installation space would be required in the wireless communication device.

Another possibility is a transmitter-side generation of the modulated signal by means of DSB-RC, wherein one of the sidebands of the modulated signal for generating the communication signal is filtered so that only the reduced carrier signal and one of the sidebands is transferred. This has the advantage, explained in more detail below, that a signal with a sideband can be demodulated, but has the disadvantage that energy must be expended unnecessarily on the transmit side for the generation of the subsequently filtered sideband.

As a further alternative, it can be provided that the reduced carrier signal and two sidebands of the modulated signal are transferred as the communication signal, wherein one of the sidebands is filtered out of the communication signal in the receiver prior to a demodulation. The generation of the modulated signal can therefore be e.g. carried out as a dual sideband modulation with suppressed carrier (DSB-RC). The filtering of one of the sidebands of the communication signal can take place on the receiver side by way of a bandpass filter, for example.

All variants have the advantage that the demodulation can be implemented only using a single sideband in the receive device. As can be seen in the Equations 4 and 7 above, during the transfer of dual sidebands the signals of the speech signal $v_{m,RX}(t)$ received in each case on the transmitter side each comprise a factor $\cos(\varphi)$, and thus a dependency of the amplitude of the demodulated speech signal on the phase relationship $\varphi$ between the carrier signal used on the transmitter side and the signal of a local oscillator generated on the receiver side.

This dependency arises because the carrier phase influences the phases of the amounts from the two sidebands in the opposite direction, as can be seen in the Equations 3 and 6 above. In the case of a phase shift of $\varphi=\pm 90°$, in the worst case it can happen that the received speech signal is extinguished completely in the receiver, so that no transfer from the patient to an operator is possible.

The demodulation using a single sideband, which can take place as described above by transferring a single sideband or by filtering one of two sidebands on the receiver side, can advantageously counteract this. A signal $v_{SSB-RC}(t)$ present on the receiver side, which is for example transferred directly as the communication signal or can be generated from the bandpass filtering of a dual sideband signal $v_{DSB-RC}(t)$, may be represented in accordance with Equation 8 below as follows:

$$v_{SSB-RC}(t)=k*\hat{V}_c*\cos(\omega_c t)+\hat{V}_m/2+\cos(\omega_c+\omega_m)t). \quad \text{Eqn. 8}$$

If this signal is demodulated, in other words multiplied by the signal of a local oscillator in accordance with Eqn. 2, then the following results, as shown in Equation 9 below:

$$K_{AM_{Demod}} * v_{SSB-RC}(t) * v_{LO}(t) = \quad \text{Eqn. 9}$$

$$\frac{k*K_{AM_{Demod}}*\hat{V}_c*\hat{V}_{LO}}{2}*(\cos(\varphi)+\cos(2\omega_c t+\varphi))+$$

$$K_{AM\_Demod}*\frac{\hat{V}_m*\hat{V}_{LO}}{4}*(\cos(\omega_m t-\varphi)+\cos((2\omega_c+\omega_m)t+\varphi)).$$

Following a bandpass filtering on the frequency of the speech signal $\omega_m$ or the frequency band of the speech signal, with the simplification $K_{AM\_Demod}=1/\hat{V}_{LO}$, the following finally results for the speech signal $v_{m,RX}(t)$ received in the receiver in accordance with Equation 10 below as follows:

$$v_{m,RX}(t)=\hat{V}_m/4*\cos(\omega_m t-\varphi). \quad \text{Eqn. 10}$$

The phase angle advantageously now no longer influences the amplitude, but only the phase of the speech signal received on the receiver side. This significantly improves the reception of the speech signal if there is no correct phase relationship between the signal of the local oscillator and the carrier signal used on the transmitter side.

During an MR sequence with a duration of several minutes, the frequency of an oscillator in the communication device, which oscillator is embodied for example as a temperature compensated crystal oscillator (TCXO) and is used to generate the carrier signal, can easily shift and be offset for example by a few Hertz. A frequency offset between the frequency of the internal oscillator and the frequency of the local oscillator in the receive device manifests itself directly in a frequency offset in the resulting speech signal $v_{m,RX}(t)$.

On account of the demodulation described above with just one of the sidebands, here only the pitch of the speech signal can however change, wherein a change with a magnitude of a few Hertz is not perceivable as a disturbance in the transfer of speech signals. Likewise, a phase relationship that changes over time is of no concern in the transfer of speech signals.

To minimize the circuit complexity in the communication device, the reduced carrier signal and two sidebands of the modulated signal may be e.g. transferred as the communication signal, wherein in the receiver one of the sidebands, in other words the upper sideband (USB) or the lower sideband (LSB), is filtered out prior to a demodulation.

According to the disclosure, the modulated signal can be generated from the carrier signal and the speech signal with a double balanced mixer, e.g. a Gilbert cell. The generation of a modulated signal as a DSB-RC signal can advantageously follow with a double balanced mixer, as the level reduction can be set in an easily realizable manner by way of a DC offset at the mixer input. A Gilbert cell can advantageously be used here as the double balanced mixer, resulting in a simple and robust design of the modulation circuit of the communication device.

In an embodiment of the disclosure, it can be provided that in the receive device the reduced carrier signal for a demodulation of the communication signal is reconstructed via a phase-locked loop, e.g. via a phase-locked loop realized in a digital signal processor. Here, the phase-locked loop can have a numerically controlled oscillator (NCO) as the local oscillator.

By means of the phase-locked loop, it is possible to generate a reconstructed carrier signal from the transferred reduced-level carrier signal of the communication signal for the demodulation of the communication signal. For instance, a reconstruction of the carrier signal can take place here without a frequency offset and without a phase shift following an engagement of the phase loop, so that a coherent demodulation is advantageously possible.

In an embodiment of the disclosure, it can be provided that during a transmit phase of the magnetic resonance imaging device, the frequency of an oscillator of the phase-locked loop is held at a value of the frequency prior to or at the start of the transmit phase, wherein the reconstructed carrier signal is generated during the transmit phase for the demodulation of the communication signal with the held frequency of the oscillator. This enables a reception of the speech signal to be present once again directly after the termination of the transmit phase. Until a repeated engagement of the phase loop, a slight frequency offset of the speech signal determined on the receiver side can occur which, as described above, does not however have an interfering effect on the speech intelligibility when the demodulation takes place only with one sideband.

The phase-locked loop can be held for example on the oscillator frequency shortly before the start or at the start of the transmit phase by the phase-locked loop being set to a hold mode when the transmit phase starts or shortly before the transmit phase starts. Following the transmit phase, the phase-locked loop can be switched from the hold mode back to a carrier track mode so that the phase-locked loop can engage once again and the demodulation of the communication signal can take place coherently and thus without a frequency offset or phase shift.

In an embodiment of the disclosure, it can be provided that a receive device embodied to receive magnetic resonance signals generated during an imaging sequence of the magnetic resonance imaging device is used to receive the communication signal. This produces e.g. a simple design of a communication arrangement, as it is advantageously possible to use a device which is already present in the magnetic resonance device for the receive apparatus of the communication arrangement.

The frequency of the carrier signal is e.g. selected such that it lies slightly outside the frequencies received during the magnetic resonance imaging, but can still be received by the receive device of the magnetic resonance imaging device. For example, a carrier frequency between 62.5 and 63 MHz can be selected for an imaging device, which on account of the magnetic field generated thereby has a receive range of 63.6 MHz±350 kHz. The speech signal can be modulated onto this accordingly as the modulation signal, wherein the bandwidth of the speech signal lies for example between 3 and 5 kHz, depending on the desired quality of the speech signal transfer.

Advantageously, the speech signal is present as a digital signal after reception in the receive device, so that the speech signal can be separated from the image data and demodulated with the aid of one or several digital signal processors as described above. For instance, the speech signal can be extracted prior to the evaluation of the image data.

For a magnetic resonance imaging device according to the disclosure, provision is made for the magnetic resonance imaging device to have a communication arrangement with a wireless communication device which can be assigned to a patient, wherein the communication device has a speech recording device for recording a speech signal of the patient, and a receive device for receiving a communication signal generated by the communication device from the speech signal, wherein the communication arrangement is embodied to carry out a method according to the disclosure.

All of the advantages and embodiments described in relation to the method according to the disclosure are also applicable analogously to the magnetic resonance imaging device according to the disclosure, and vice versa.

BRIEF DESCRIPTION OF THE DRAWINGS/FIGURES

Further advantages and details of the present disclosure are disclosed in the following description of exemplary embodiments and by reference to the drawings, in which:

FIG. 3 shows a further block diagram of an exemplary embodiment according to the disclosure.

DETAILED DESCRIPTION

Figure 1:
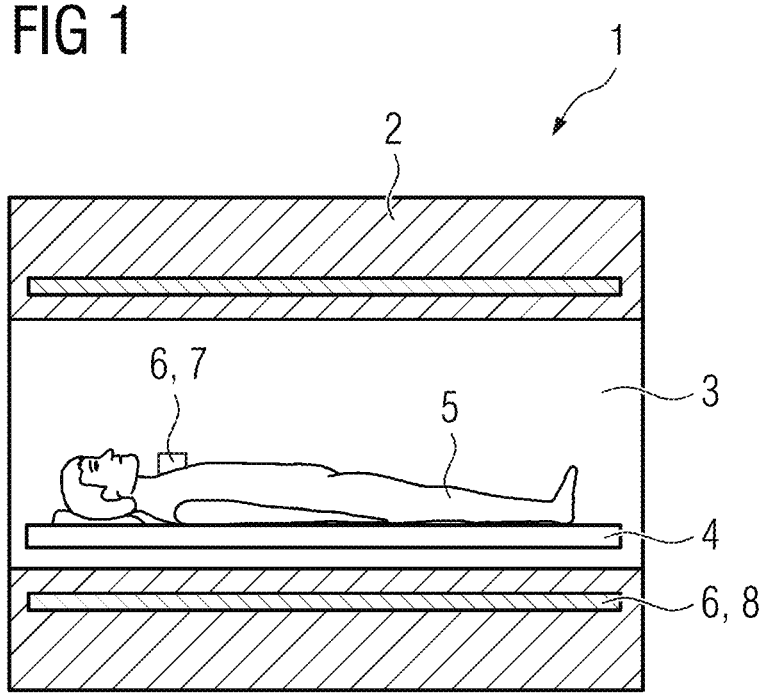
FIG. 1 shows an exemplary embodiment of a magnetic resonance imaging device according to the disclosure.

FIG. 1 illustrates an exemplary embodiment of a magnetic resonance imaging device 1 according to the disclosure. The magnetic resonance imaging device 1 comprises a scanner unit 2, in which a main magnet of the imaging device 1 is arranged. The scanner unit 2 further comprises a patient aperture 3, in which a patient positioning apparatus 4 with a patient 5 can be arranged.

The imaging device 1 further comprises a communication circuitry 6 (e.g. a communication arrangement), which has a wireless communication device 7, which can be assigned to the patient 5, and a receive device 8. Here, the receive device 8 is likewise embodied to receive magnetic resonance signals generated during an imaging sequence of the magnetic resonance imaging device 1.

The receive device 8 is further used to receive a communication signal, wherein the communication signal is transmitted from the communication device 7 to the receive device 8. The communication device 7 e.g. continuously records a speech signal of the patient 5 or an audio signal from the immediate vicinity of a head of the patient 5, and generates a communication signal from the speech signal. The communication signal is transmitted from the communication device 7 to the receive device 8. The communication device 7 therefore represents the transmitter configured to transfer the communication signal or the speech signal, and the receive device 8 represents the receiver.

Figure 2:
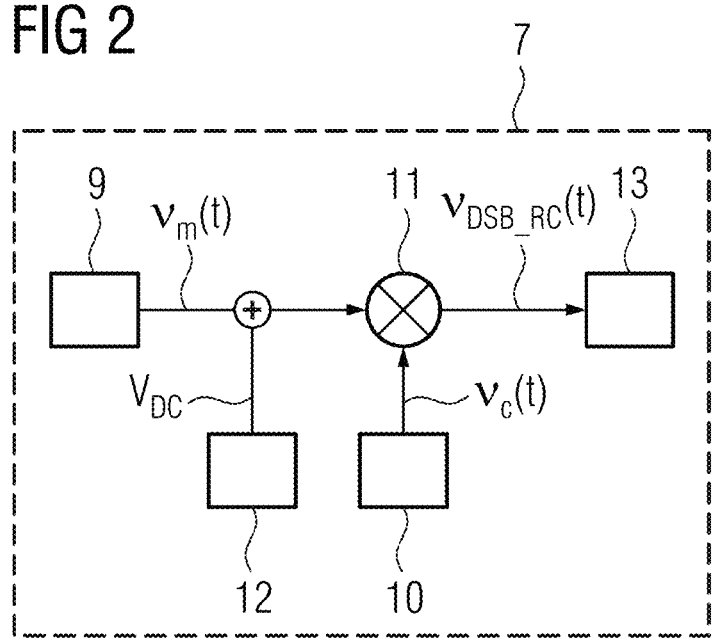
FIG. 2 shows a first block diagram of an exemplary embodiment of a method according to the disclosure.

FIG. 2 illustrates a schematic block diagram of the communication device 7. In an exemplary embodiment of a method for transferring at least one speech signal of the patient 5 during a magnetic resonance imaging examination using the magnetic resonance imaging device 1, a communication signal is generated from the speech signal and transmitted from the communication device 7 to the receive device 8. The communication signal is generated in the communication device 7 as a modulated signal or from a modulated signal, as noted herein.

To generate the modulated signal, the speech signal is modulated onto a carrier signal, wherein the modulated signal is generated by way of a modulation with reduction of the level of the carrier signal. To record the speech signal, the communication device 7 comprises a speech acquisition device 9 embodied as a microphone, via which the speech signal $v_m(t)$ can be recorded. Here, the speech signal $v_m(t)$ corresponds to the sound recorded in the immediate vicinity of the patient 5 and can comprise e.g. words spoken by the patient 5.

The speech signal is modulated as a modulation signal onto a carrier signal $v_c(t)$, wherein the carrier signal is generated by a carrier signal generator 10. The carrier signal generator 10 can be or comprise for example a temperature compensated crystal oscillator.

The frequency of the carrier signal $v_c(t)$ is selected such that it lies slightly outside the frequencies received during the magnetic resonance imaging, but can still be received by the receive device 8 of the magnetic resonance imaging device 1. For example, a carrier frequency $\omega_c$ between 62.5 MHz and 63 MHz can be selected for an imaging device 1, which on account of the magnetic field generated thereby, has a receive range of 63.6 MHz±350 kHz. The speech signal $v_m(t)$ can be modulated onto this accordingly as the modulation signal, wherein the bandwidth of the speech signal lies e.g. between 3 kHz and 5 kHz, depending on the desired quality of the speech signal transfer.

In the present exemplary embodiment, the modulated signal is generated by means of a dual sideband modulation with reduced carrier (DSB-RC). To this end, the communication device 7 comprises a double balanced mixer 11, which generates the corresponding modulated signal $v_{DSB}$-

$_{RC}$(t) from the speech signal $v_m$(t) and the carrier signal $v_c$(t). The double balanced mixer 11 can be implemented e.g. as a Gilbert cell.

The suppression of the carrier takes place through the introduction of an asymmetry into the circuitry of the double balanced mixer 11. In this case, a DC offset $V_{DC}$ is created at the modulation signal input at which the speech signal $v_m$(t) is present. Here, the DC offset $V_{DC}$ is generated by an offset device 12, for example a voltage source, of the communication device 7.

The modulated signal $v_{DSB-RC}$(t) generated by the mixer 11 is then transmitted via a transmit apparatus 13 of the communication device 7, which comprises for example one or more antennas, to the receive device 8. During the modulation, the level of the carrier signal $v_c$(t) is reduced in comparison with an amplitude modulation with a full carrier level, for example by any suitable factor such as between −10 dB and −40 dB, for example by −30 dB. This makes it possible to transfer a communication signal even during receive phases of a magnetic resonance imaging without impairing the imaging or the imaging quality.

FIG. 3 shows a block diagram illustrating the signal processing on the receiver side in an exemplary embodiment. The receive device 8 comprises at least one radio-frequency antenna unit 14, which can also be used to receive the image data during an imaging sequence of the imaging device 1. The receive device 8 also comprises a computing unit 15, which is realized for example as a digital signal processor. The communication signal $v_{DSB-RC}$(t) is received via the radio-frequency antenna unit 14 and fed to a first bandpass filter 16. From the received dual sideband signal with the reduced carrier, the bandpass filter 16 allows the portion of the reduced carrier and one of the sidebands, for example the upper sideband, to pass through and thus forms a single sideband signal with reduced carrier $v_{SSB-RC}$(t). This contains the carrier signal $v_c$(t) with an amplitude reduced by the factor k, or a level reduced by a factor k according to Eqn. 8.

The reconstruction of the carrier signal for the demodulation takes place in a phase-locked loop 17, which comprises for example a numerically controlled oscillator (NCO) as the local oscillator, the frequency of which is adjusted to the frequency $\omega_c$ of the carrier signal. Furthermore, an adjustment of the phase is also performed using the phase-locked loop, so that in the engaged state of the phase-locked loop 17 there is no phase shift in the local oscillator signal $v_{LO}$(t) generated accordingly.

For the demodulation of the speech signal $v_m$(t), the bandpass-filtered communication signal $v_{SSB-RC}$(t) and the signal of the local oscillator $v_{LO}$(t) are multiplied in a mixer 18. A second bandpass filter 19 can then be used to filter out the speech signal in the receiver $v_{m,RX}$(t) according to Eqn. 10 from the product $v_{SSB-RC}$(t)*$v_{LO}$(t) according to Eqn. 9.

Because during the excitation phases of the magnetic resonance imaging device 1 no reception of the communication signal occurs, and thus no frequency- or phase-corrected reconstruction of the carrier signal as the local oscillator signal $v_{LO}$(t) in the receive device 8 is possible, during an excitation phase of the imaging device 1 the frequency of the internal oscillator of the phase-locked loop 17 is set to a value of the frequency prior to or at the start of the transmit phase. The carrier signal $v_{LO}$(t) reconstructed with the fixed frequency can thus also be used briefly after the transmit phase for the demodulation of the communication signal, in this case the filtered communication signal $v_{SSB-RC}$(t), so that advantageously a speech transmission can already take place even before the re-engagement of the phase-locked loop 17 on a transmitted carrier signal portion of the communication signal. For example, this also improves the speech transfer during the imaging sequences of the magnetic resonance imaging device 1.

For defining the frequency of the local oscillator of the phase-locked loop 17, the phase-locked loop 17 can be placed in a holding state for example by a control device 20 of the imaging device 1 if an MR sequence, triggered for example by the control device 20, is impending or starts. After termination of the sequence, the phase-locked loop 17 is for example placed back into an operating mode, for example a carrier track mode, so that once again an engagement of the phase-locked loop 17 onto the carrier signal $v_c$(t) or the carrier signal portion of the filtered communication signal $v_{SSB-RC}$(t) can take place.

In an alternative exemplary embodiment of the method or in an alternative exemplary embodiment of an imaging device 1, it can be provided that the communication signal already generates a modulated signal formed by means of single sideband modulation with reduced carrier (SSB-RC) on the transmitter side, and transfers the modulated signal to the receive device 8. Alternatively, a DSB-RC signal, as shown in FIG. 2, can be generated as a modulated signal, wherein in the communication device 7 with the aid of a bandpass filter one of the sidebands of the modulated signal is filtered out to generate the subsequently-transmitted communication signal.

If a single sideband modulated signal $v_{SSB-RC}$(t) is received directly via the radio-frequency antenna 14 as the communication signal, it is possible to dispense with the first bandpass filter 16. In such an embodiment, too, it is advantageously possible for there to be no phase dependency during demodulation on the amplitude of the speech signal $v_{m,RX}$(t) determined on the receiver side, which depends on the phase angle between the signal $v_{LO}$(t) of the local oscillator and the carrier signal $v_m$(t).

In a further exemplary embodiment, it is possible for the filtering of one of the sidebands via the bandpass filter 16 to be dispensed with and for the dual sideband signal $v_{DSB-RC}$(t) received by the radio-frequency antenna 14 to be fed directly to the mixer 18. In this case, too, a transfer of the communication signal which has been generated from a modulated signal by way of a modulation with suppressed carrier is enabled.

Although the disclosure has been illustrated and described in greater detail on the basis of the exemplary embodiments, the disclosure is not limited by the disclosed examples and other variations can be derived herefrom by the person skilled in the art without leaving the scope of protection of the disclosure.

The various components described herein may be referred to as "devices" or "units." Such components may be implemented via any suitable combination of hardware and/or software components as applicable and/or known to achieve the intended respective functionality. This may include mechanical and/or electrical components, processors, processing circuitry, or other suitable hardware components configured to execute instructions or computer programs that are stored on a suitable computer readable medium. Regardless of the particular implementation, such devices and units, as applicable and relevant, may alternatively be referred to herein as "circuitry," "processors," or "processing circuitry."

What is claimed is:

1. A method for transferring a speech signal of a patient during a magnetic resonance imaging examination, comprising:

recording the speech signal via a speech recording device of a wireless communication device;

generating a modulated signal based upon a modulation of the speech signal onto a reduced amplitude carrier signal, the reduced amplitude carrier signal having a reduced amplitude as a result of reducing, by a reduction factor, an amplitude of a carrier signal used for transmission in accordance with a communication protocol; and transmitting a communication signal to a receiver of the magnetic resonance imaging device during a receiving phase of the magnetic resonance imaging device such that the receiver receives magnetic resonance signals corresponding to an imaging sequence of the magnetic resonance imaging device concurrently with receiving the communication signal, wherein the communication signal comprises (i) the modulated signal, or (ii) a processed signal that is generated by processing the modulated signal.

2. The method as claimed in claim 1, wherein the reduced amplitude carrier signal and a sideband of the modulated signal are transmitted as the communication signal.

3. The method as claimed in claim 1, wherein the reduced amplitude carrier signal and two sidebands of the modulated signal are transmitted as the communication signal, and
wherein one of the sidebands is filtered out of the communication signal in the receiver prior to demodulation.

4. The method as claimed in claim 1, wherein the generating the modulated signal comprises:
generating the modulated signal by modulating the speech signal onto the reduced amplitude carrier signal using a double balanced mixer.

5. The method as claimed in claim 4, wherein the double balanced mixer comprises a Gilbert cell.

6. The method as claimed in claim 1, further comprising:
reconstructing, via a phase-locked loop of the receiver, the reduced amplitude carrier signal to generate a reconstructed carrier signal for demodulation of the communication signal.

7. The method as claimed in claim 6, wherein the phase-locked loop of the receiver is implemented in a digital signal processor.

8. The method as claimed in claim 6, further comprising:
maintaining, during a transmit phase of the magnetic resonance imaging device, a frequency of an oscillator of the phase-locked loop at a frequency of the oscillator prior to or at a start of the transmit phase, and
wherein the reconstructed carrier signal is generated during the transmit phase having the maintained frequency of the oscillator.

9. A magnetic resonance imaging device for transferring a speech signal of a patient during a magnetic resonance imaging examination, comprising:
communication circuitry configured to:
record the speech signal;
generate a modulated signal based upon a modulation of the speech signal onto a reduced amplitude carrier signal, the reduced amplitude carrier signal having a reduced amplitude as a result of reducing, by a reduction factor, an amplitude of a carrier signal used for transmission in accordance with a communication protocol; and
transmit a communication signal to a receiver of the magnetic resonance imaging device during receiving phase of the magnetic resonance imaging device such that the receiver receives magnetic resonance signals corresponding to an imaging sequence of the magnetic resonance imaging device concurrently with receiving the communication signal,
wherein the communication signal comprises (i) the modulated signal, or (ii) a processed signal that is generated by processing the modulated signal; and
a receiver configured to receive the communication signal.

10. The method as claimed in claim 1, wherein the communication signal is continuously transmitted to the receiver during the magnetic resonance imaging examination.

11. The method as claimed in claim 1, wherein the reduced amplitude carrier signal has a frequency that is proximate to but outside of a range of frequencies corresponding to the magnetic resonance signals.

12. The method as claimed in claim 1, wherein the generating the modulated signal comprises:
generating the modulated signal by modulating the speech signal onto the reduced amplitude carrier signal using a dual sideband modulation with reduced carrier (DSB-RC) modulation scheme.

13. The method as claimed in claim 1, further comprising:
generating a DC offset voltage; and
generating the reduced amplitude carrier signal based upon a modulation of a sum of the speech signal and the DC offset voltage.

14. The method as claimed in claim 1, wherein the reduction factor of the reduced amplitude carrier signal comprises a reduction −10 dB to −40 dB with respect to a carrier amplitude level used in accordance with a dual sideband modulation with carrier (DSB-WC) modulation scheme.

* * * * *